3 Sheets—Sheet 1.

E. TOTMAN.

MODE OF CONSTRUCTING FRAME HOUSES.

No. 10,678. Reissued Jan. 12, 1886.

Witnesses:-
Louis M. Whitehead.
C. F. Poole

Inventor:-
Edsell Totman.-
by: M. E. Dawson
Attorney.-

3 Sheets—Sheet 2.
E. TOTMAN.
MODE OF CONSTRUCTING FRAME HOUSES.
No. 10,678. Reissued Jan. 12, 1886.
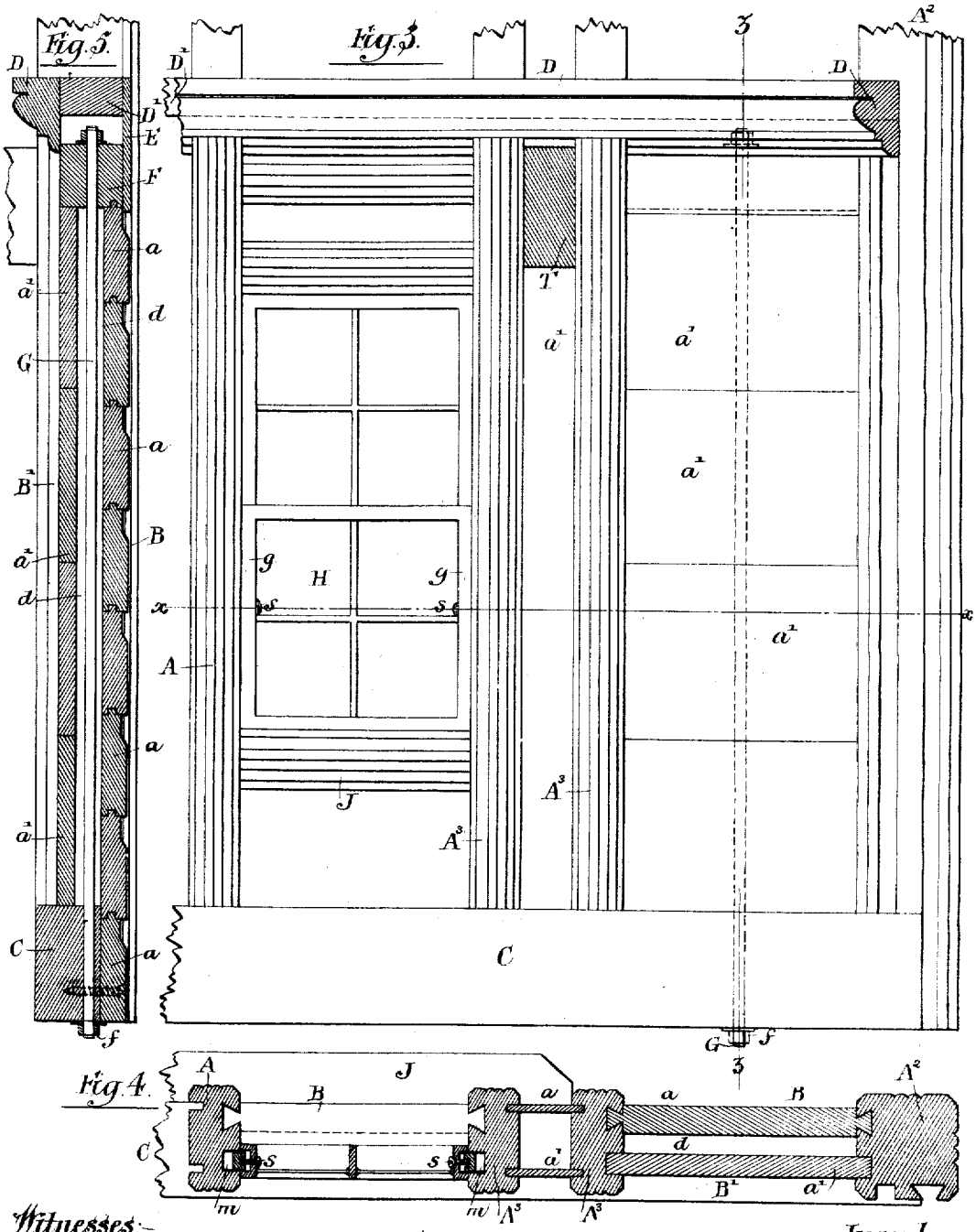
Witnesses:-
Louis M. Whitehead
C. C. Poole
Inventor:-
Edsell Totman
by:- M. E. Dayton
Attorney.

E. TOTMAN.

MODE OF CONSTRUCTING FRAME HOUSES.

No. 10,678. Reissued Jan. 12, 1886.

Witnesses:-
Louis M. T. Whitehead
C. C. Poole

Inventor:-
Edsell Totman
by: M. P. Dayton
Attorney:-

UNITED STATES PATENT OFFICE.

EDSELL TOTMAN, OF HINSDALE, ILLINOIS.

MODE OF CONSTRUCTING FRAME HOUSES.

SPECIFICATION forming part of Reissued Letters Patent No. 10,678, dated January 12, 1886.

Original No. 299,598, dated June 3, 1884. Application for reissue filed June 6, 1885. Serial No. 167,898.

*To all whom it may concern:*

Be it known that I, EDSELL TOTMAN, of Hinsdale, in the county of Du Page and State of Illinois, have invented certain new and useful Improvements in the Mode of Constructing Houses; and I do hereby declare that the following is a full, clear, and exact description thereof, reference being had to the accompanying drawings, and to the letters of reference marked thereon, which form part of this specification.

Figure 1:
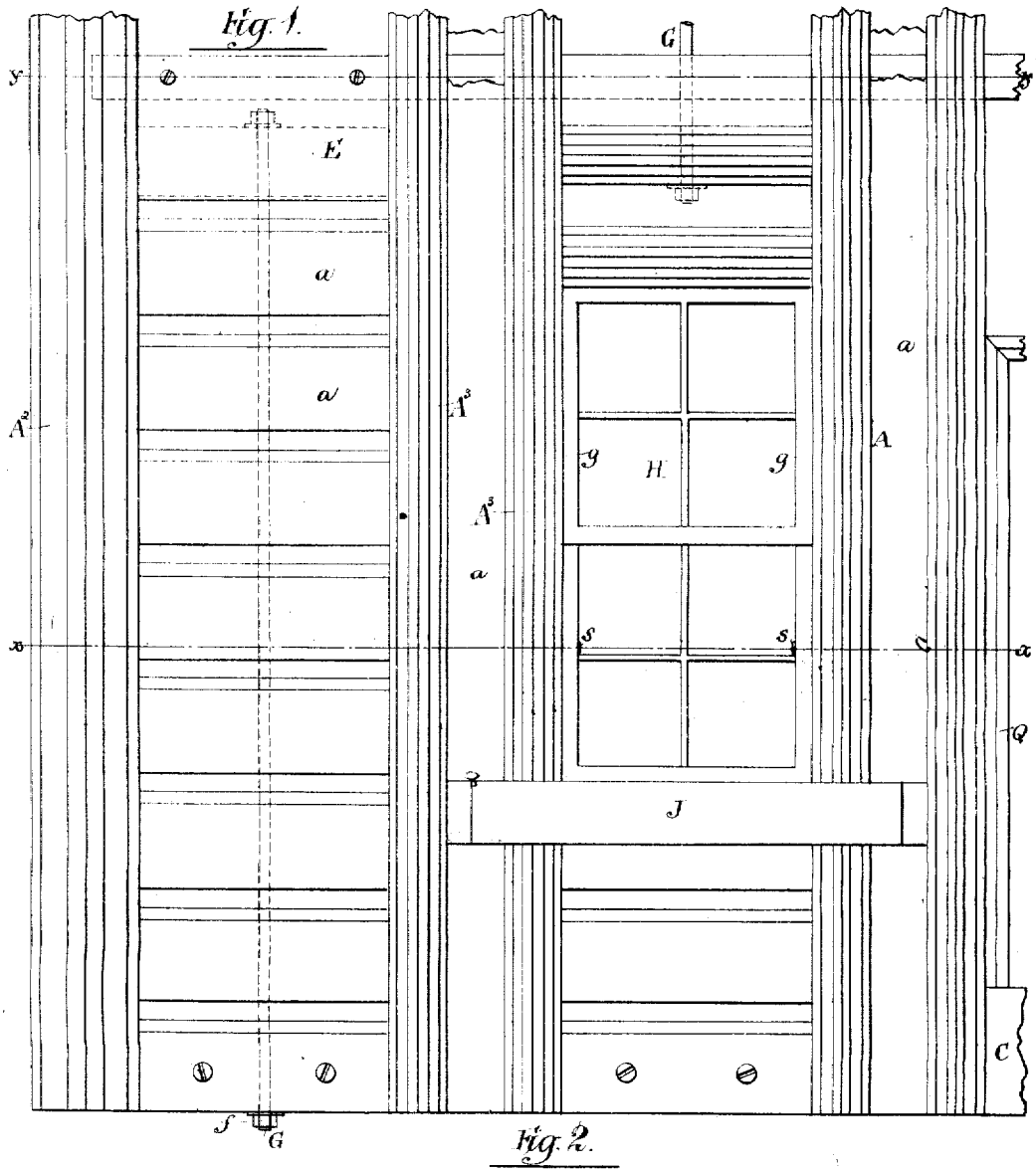
Figure 2:
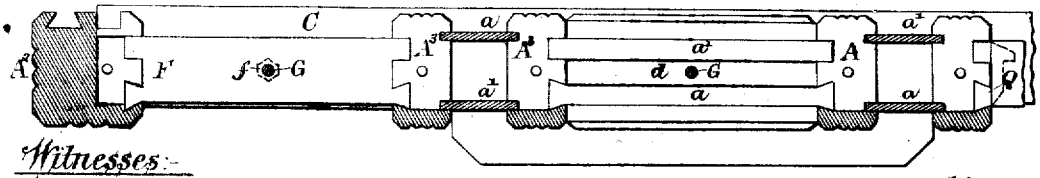
Figure 6:
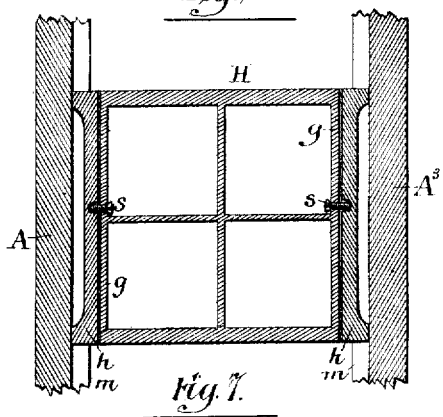
Figure 7:
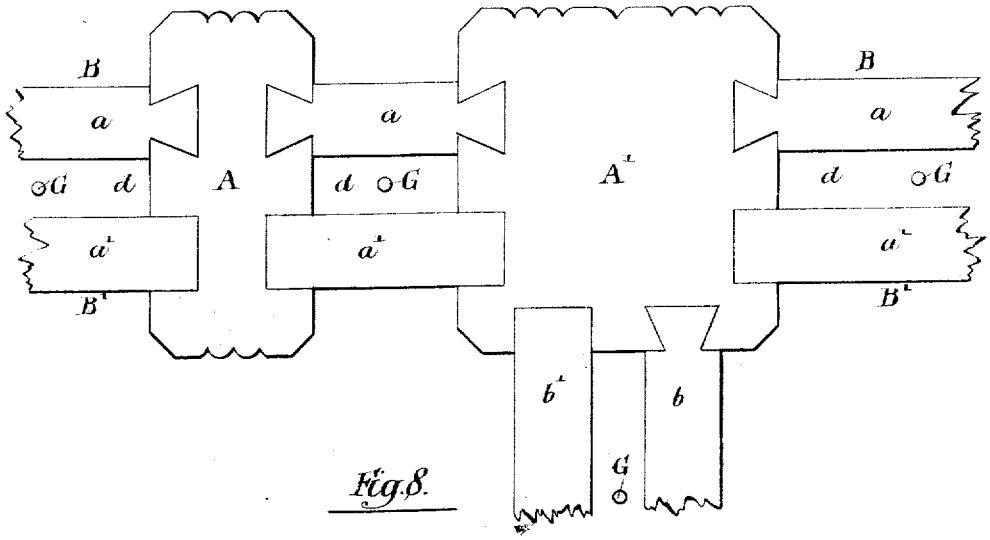
Figure 8:
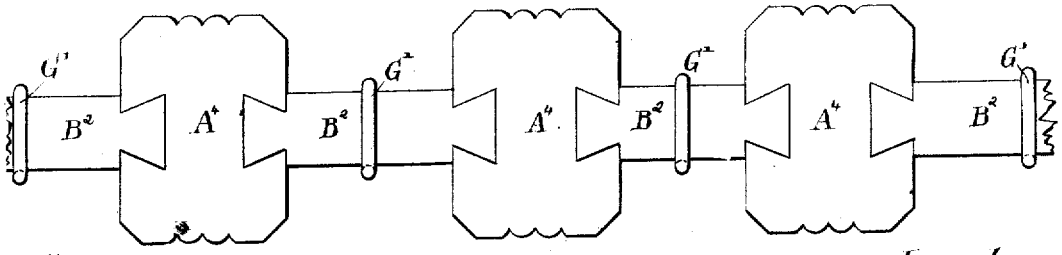
Figure 9:
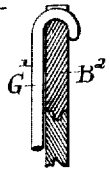

In the accompanying drawings, Figure 1 is an elevation of a portion of the outside of a house constructed in accordance with my invention. Fig. 2 is a horizontal section taken upon the line *y y* of Fig. 1. Fig. 3 is an elevation and partial section illustrating a portion of the inside of a house constructed in accordance with my invention. Fig. 4 is a horizontal section taken upon the line *x x* of Figs. 1 and 3. Fig. 5 is a vertical section taken upon the line *z z* of Fig. 3. Fig. 6 is a detail section through one of the window-frames and one of the window-sashes. Fig. 7 is a diagram illustrating my invention, the same showing an outer, inner, and cross walls, as constructed in accordance with my invention. Fig. 8 is a diagram showing a modification of my invention as applied in the construction of a house having a single solid wall, and Fig. 9 is a detail vertical section of a portion of Fig. 8.

One object of my invention is to provide an improved construction in frame houses, whereby the planks or boards constituting the walls thereof may be drawn up or forced together to close up any cracks between the said planks or boards which may be caused by shrinkage in the latter or otherwise.

Other objects are to provide improvements in that class of frame houses which are made in sections or parts adapted for convenient transportation to localities distant from the place of manufacture, to be there joined or set up; to provide means for holding in place a window-sash, whereby removable bead-strips are dispensed with and the sash is at the same time rendered conveniently removable, when necessary, and to improve the construction of frame houses in other particulars, as will hereinafter appear.

In Fig. 7, A indicates one of the upright studs, which I preferably use in the spaces between the doors and windows when such space is of a greater width than about three feet, and B B′ the outer and inner walls, which are composed of planks or boards, as *a* and *a′*. A′ indicates one of the studs used, constructed as shown, which is set into the wall of the house at such points where it is necessary to form a partition, as indicated at *b* and *b′*.

As shown in Fig. 7, the outer wall may connect with the upright studs A and A′ by a dovetail connection, and thus sufficiently bind the walls in place, while the inner wall may be simply let into a square longitudinal groove in said studs.

In Fig. 5 the mode of constructing the two walls is indicated, the outer wall, B, having its planks connected together with a tongue and groove, while the planks composing the inner wall, B′, are only matched on their edges and let into a square groove of the studs, as seen in Figs. 2, 4, and 7.

Having reference to Figs. 3, 4, and 5, C indicates one of the foundation-timbers, such as are usually used in the construction of houses, which timbers may be bolted or otherwise secured to foundation-walls beneath in any proper manner, and on these timbers C the double walls, as shown, are erected, leaving a dead-air space, *d*, between them from the top to the bottom of the double wall.

Having reference to Figs. 3 and 5, D indicates a molding, which extends along the inner walls of the house, as shown, and is permanently attached to a beam, D′, which is supported upon the upright studs and dovetailed therewith, so as to hold the beam in a permanent position. E is a frieze-board attached to the beam D′, extending down a considerable distance and far enough to reach down to the top of the planking of the outer wall, B, said outer wall, as well as inner wall, B′, having their upper planks let into a groove on the under side of a movable beam, F, which, by a long bolt, G, is connected, as shown, with the base or foundation timber C, whereby as the walls shrink they can be tightened up, the beam F during such act being drawn down toward the lower edge of the frieze-board E, and the frieze-board serving to close up the space thus formed between the said beam F and the beam D′, so as to prevent ingress of air or weather at the top of the walls. Thus by tightening up bolts G, which are provided for all the walls which are between the upright studs, the shrinkage of the walls will not be observed, since the shrinkage will always be compensated for by the descent of the movable beam F in rear of the frieze-board E, and in this manner all cracks, both in the outer and inner wall, will be closed simply by tightening the rod G, this being accomplished by turning the screw-nut *f*, access to which may be provided in any proper manner.

In constructing a house upright frame-pieces or studding, as A or A′ in Fig. 7, or as A, $A^2$, and $A^3$ in Figs. 1, 2, 3, and 4, will be preferably placed upon each side of the windows and doors, so as to form the side pieces of the window and door frames, and thereby render unnecessary separate frame-pieces for this purpose.

As shown in said Figs. 1, 2, 3, and 4, the said studs, instead of being united directly with the transverse wall-planks at both sides of them, as shown in Figs. 7 and 8, are connected with the wall-planks at one of their sides only, and each series of planks is provided at both sides with separate frame-pieces, so that separate and integral wall sections or panels are thereby formed, the marginal frame-pieces of which, when the sections or panels are set up to form a wall, are located adjacent to each other, and thus form double frame-pieces or studding to the building. The frame-pieces of the adjacent panels in the particular construction illustrated in said figures are separated a sufficient distance to receive between them the joists T of the upper floor, the space between the separated frame-pieces or studs being filled by inner and outer vertically-arranged planks held at their edges in longitudinal grooves in the studs, and forming parts of the inner and outer walls, *a a′*, of the building. The joists T may in this construction be sustained partially or entirely upon the said boards, or otherwise supported, as found convenient or desirable.

In Fig. 6 I have shown in vertical section a window. (Represented in cross-section in Fig. 4 and in elevation in Fig. 3.) In this window the rails *g g* of the sash H are grooved to receive wooden spring-strips *h*, constructed as shown, which move up and down with the sash and in grooves *m m* of the studs A $A^3$. (Shown in Figs. 4 and 6.) Set-screws *s s*, passed through the rails *g g* of the sash, are made to engage recesses in and to press against the strips *h h*, whereby the said strips are caused to move with the sash, and the latter may be made to retain a given elevated position by the pressure of the end portions of said strips against the said studs A $A^3$. By turning far enough back the set-screws *s s* the sash H may be moved from between the strips by either raising or lowering the sash far enough to clear the upper or lower ends of the said strips.

The important purpose of the strips *h* is to enable the window to be removably held between the studs without the use of removable bead-strips, such as are customarily employed, and for this purpose the spring construction in the strips shown is not essential, inasmuch as the yielding or spring action of the strips is not concerned in the results of greater simplicity and convenience obtained by the use of the strips engaged with the grooves of the sash and studs for removably holding the said sash in place. The strips *h* also may obviously be detachably connected with the sash, so as to move with the latter, by means other than the set-screws shown. The use of the latter is preferred, however, as affording a simple and effective means for this purpose.

As shown in Fig. 4, $A^2$ is a stud adapted for use at the corner of a house, and in Fig. 8 studs, as A′, of a modified form and adapted for a single-wall house are shown. The single wall $B^2$, shown in this figure, may have its shrinkage tightened up by a rod, as G′, hooked over the top of the wall, as shown in Fig. 9, and extending down and connected to a foundation-timber C, as hereinbefore described. In this case a cornice, as D, and frieze-board, as E, attached on either side of a fixed timber, D′, as hereinbefore described, will be provided in connection with such single wall and for the same purpose.

In Figs. 1 and 2 part of a doorway-casing is shown, the door-jamb being made by using a strip or molding, as indicated at Q in Fig. 2, said strip or molding being provided with tongues constructed to enter or engage the grooves of the studs. By this construction the strips may be readily and accurately put in place, and secured to the studs by nails or by making the tongues of dovetail form, as shown.

As shown in Figs. 1 and 2, J indicates a window-sill which may be made of a single piece of wood and be inserted through the double walls and between adjacent studs, as shown. The wall-sections of the panels formed by the transverse planks or boards and the longitudinal pieces or studs A $A^3$ or $A^2$ and $A^3$ connected therewith, as shown in Figs. 1, 2, 3, and 4, obviously form integral parts or sections, which may be manufactured in a locality distant from the place of erection, and conveniently and compactly transported and used with other similar sections in the construction of houses. The vertically-arranged planks, shown in the said figures as located between the adjacent studs, and held at their edges in grooves in the latter, obviously serve as a convenient means for making a close joint between the panels, but panels or sections constructed generally as shown may obviously be joined at their margins by other well-known or preferred devices for this purpose.

One important feature of novelty in my invention is that embodied in the construction, whereby an integral wall-section or panel is formed by longitudinally-grooved studs or frame-pieces, and transverse planks movably held in or upon said frame-pieces, together with means retaining the ends of the planks in engagement with the said frame-pieces, and tightening devices for forcing together the planks, so as to close the joints between them, and this construction is therefore broadly claimed without limitation to the particular construction shown either in the tightening devices themselves or in the means for connecting the planks with the frame-pieces.

The construction described and shown whereby the transverse planks are united with the longitudinal frame-pieces by means of dovetailed tongues and grooves obviously affords a simple, convenient, and economical means of joining the parts, and this feature of construction is therefore herein also claimed.

It is to be understood also that in the construction set forth in the appended claims 1, 3, 5, and 9, the presence of tightening devices as part of the structure is not necessarily involved, inasmuch as the planks may be forced together by external means, as by a lever or by driving with a hammer or mallet, and the end planks secured by nailing or otherwise to prevent the planks again spreading apart.

It will be seen that a house constructed in the manner above described can be papered, and will have the appearance of a plastered house by allowing the walls to shrink sufficiently and tightening them up before papering; that by means of the tightening-bolts all the cracks or joints may be made perfectly tight, so as to leave no chance for the walls to afterwards shrink and crack the paper, as is liable to be the case when the ceiling is nailed to studding in the ordinary manner; and, further, that by the particular means shown for tightening the shrinkage of the walls I at the same time afford a means for anchoring the house, so to speak, to the foundation below the ground, thus affording security against storms, which otherwise might blow the house to pieces or wrench it from its foundation.

I claim as my invention—

1. The combination, with the longitudinal frame-pieces of a house, provided with dovetailed grooves, of planks provided upon their ends with dovetailed tongues engaged with the said grooves, substantially as and for the purpose set forth.

2. The combination, with the longitudinal frame-pieces of a house, provided with dovetailed grooves, of planks having dovetailed tongues upon their ends, engaged with the grooves, and means for forcing together the planks, whereby the joints between them may be tightened, substantially as described.

3. As a separately portable element in house construction, a wall-section composed of two longitudinally-grooved marginal frame-pieces, transverse planks held movably at their ends in the grooves of the frame-pieces, and means holding the ends of the planks in engagement with the frame-pieces, the whole forming an integral section or member adapted to be joined with other and similar sections, to form both the frame-pieces and the sheathing or siding of a house-wall, substantially as described.

4. A section or panel for the construction of houses comprising longitudinal grooved studs or frame-pieces, transverse planks held at their ends in the grooves of the frame-pieces, means holding the ends of the planks in engagement with the frame-pieces in proper relative position, and means for forcing said planks together, to tighten the joints between the latter, substantially as described.

5. As an integral member in house construction, a panel or section composed of two marginal frame-pieces having dovetailed grooves in their proximate faces, and planks provided with dovetailed tongues on their ends, inserted in said grooves, and thereby uniting said pieces with each other and with the planks, to form such integral section or member, substantially as and for the purpose set forth.

6. The combination, with the frame-pieces of a house and transverse planks movably held upon the frame-pieces, of means for tightening the joints between the planks, consisting of bolts applied to draw or force the opposite end planks toward each other, substantially as described.

7. The combination, with the parallel frame-pieces of a house, provided with dovetailed grooves, and a series of planks having upon their ends dovetailed tongues engaged with the same grooves, of means for tightening the joints between the said planks, consisting of bolts applied to draw or force toward each other the planks at the opposite ends of the series, substantially as described.

8. The combination, with the studding of a house and a double series of planks forming inner and outer walls, of means for holding the planks from movement at one end of the studding, a movable bar or follower located in contact with the end planks of both the inner and outer walls at the opposite end of the studding, and bolts applied to force the said follower against the said end planks, whereby the joints in both the inner and outer walls may be tightened, substantially as described.

9. A frame house having wooden walls provided with vertical tie and tightening rods, boarding E, and foundation C, whereby wind and water cracks are closed, substantially as described.

10. The combination of the walls B B′, foundation C, movable beam F, screw-bar G, and means for tightening the same, substantially as and for the purpose described.

11. The frieze-board E, in combination with the movable beam F, walls B B′, and foundation C, substantially as and for the purpose described.

12. A frame house provided with upright studs having longitudinal dovetail grooves to receive the planking, which constitutes the walls of th house, and with vertical tightening-rods G, movable beam F, and frieze-board E, substantially as and for purpose described.

13. The combination, with the grooved studs of a house and grooved window-sash H, of strips *h*, inserted in the grooves of the studs and sash, and means for detachably connecting said strips with the sash, substantially as and for the purpose set forth.

14. The combination, with the grooved studs of a house and grooved window-sash H, of wooden spring-strips *h*, inserted in the grooves of the studs and sash, and means connecting the strips with the sash, constructed to hold the said strips free from the sash, substantially as and for the purpose set forth.

15. The combination of upright studs A A', sash H, wooden spring-strips *h h*, and tightening-screws *s s*, substantially as and for the purpose described.

16. The combination, with the studding of a building, provided with longitudinal grooves, of a door-frame having a side piece or jamb provided with tongues engaging the grooves of the studs, substantially as described.

In testimony that I claim the foregoing as my invention I affix my signature in presence of two witnesses.

EDSELL TOTMAN.

Witnesses:

C. CLARENCE POOLE,

M. E. DAYTON.

Correction in Reissue Letters Patent No. 10,678.

It is hereby certified that in Reissue Letters Patent No. 10,678, granted January 12, 1886, upon the application of Edsell Totman, of Hinsdale, Illinois for an improvement in "Mode of Constructing Frame Houses," an error appears in the printed specification requiring correction as follows: In lines 76–7, page 3, the words "in proper relative position" should be stricken out; and that the said Letters Patent should be read with this correction therein that the same may conform to the record of the case in the Patent Office.

Signed, countersigned, and sealed this 26th day of January, A. D. 1886.

[SEAL.]

H. L. MULDROW,
*Acting Secretary of the Interior.*

Countersigned:

M. V. MONTGOMERY,
*Commissioner of Patents.*